No. 651,259. Patented June 5, 1900.
T. McGOVERN.
CAR FENDER.
(Application filed Mar. 31, 1899. Renewed Nov. 7, 1899.)
(No Model.)
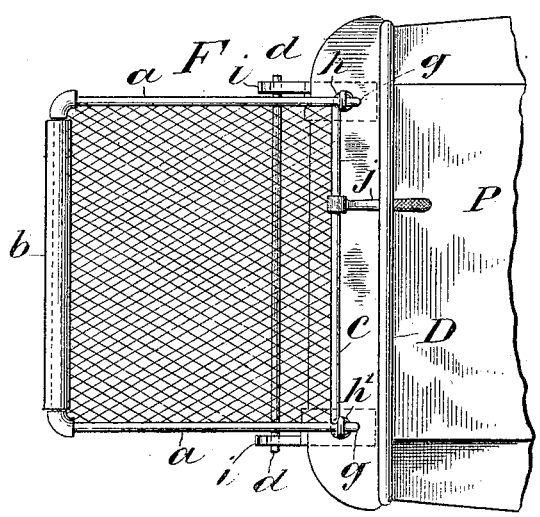
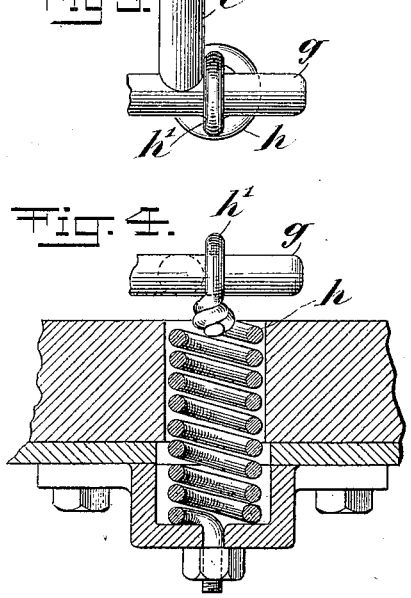
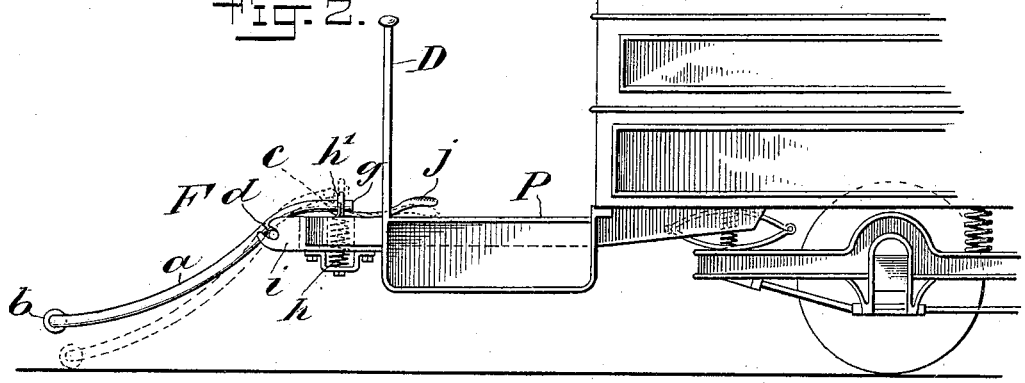
WITNESSES:
F. N. Roehrich
Peter A. Ross
INVENTOR
Thomas McGovern
BY
ATTORNEY

UNITED STATES PATENT OFFICE.

THOMAS McGOVERN, OF NEW YORK, N. Y.

CAR-FENDER.

SPECIFICATION forming part of Letters Patent No. 651,259, dated June 5, 1900.

Application filed March 31, 1899. Renewed November 7, 1899. Serial No. 736,190. (No model.)

*To all whom it may concern:*

Be it known that I, THOMAS McGOVERN, a citizen of the United States, residing in the city of New York, borough of Brooklyn, in the county of Kings and State of New York, have invented certain new and useful Improvements in Car-Fenders, of which the following is a specification.

This invention relates to the class of car-fenders which are adapted to be depressed by the motorman in an emergency, and also to the class in which the fender is adapted to be lifted off from its bearings at one end of the car and shifted to the other end thereof for the return trip.

It is well understood that the expense incurred in providing cars with fenders is very considerable at best and that it is not possible to have a costly and complex fender introduced and used on a railway, the cost being prohibitive. Hence the object of the present invention is to produce a fender having the two primary advantages—namely, capability of being instantly depressed by the motorman in an emergency and capability of being readily shifted from one end of the car to the other—and also to provide such a fender at a very moderate cost.

In the accompanying drawings I have illustrated an embodiment of the invention, in which—

Figure 1 is a plan view of the fender and of the end or platform of the car on which it is mounted, and Fig. 2 is a side elevation of the same. Fig. 3 is a plan, and Fig. 4 a sectional detail view, illustrating one of the springs which support the front ends of the fender; and Fig. 5 is an enlarged detail view of the rocking foot-lever for depressing the fender.

P represents the platform, and D the dashboard, of an ordinary motor-car, and F represents the fender as a whole.

The fender may consist of a simple frame covered with netting, and herein such frame comprises two side bars $a\, a$, properly curved, a front bar $b$, which may be covered with some soft cushioning material, and a rear bar $c$. The fender has pivoting-lugs $d\, d$ at its sides, and these may be conveniently formed by a transverse bar with projecting ends, and the side bars $a\, a$ extend beyond the rear bar $c$ from lugs $g\, g$ to engage, respectively, eyes in the ends of springs on the car when the fender is in place. Figs. 3 and 4 show the preferred form of spring $h$, secured at its lower end and extending upward through an aperture in the projecting sill of the car. At its upper end it has an eye $h'$, which is engaged by the lug $g$. The pivoting-lugs $d$ rest in recesses or rocking bearings in brackets $i$, which project from the sills of the car at each side.

When the fender is in place on the car, as seen in Figs. 1 and 2, its front bar $b$ is upheld by the springs $h$ in substantially the position seen in full lines in Fig. 2, so that the car may rock on its springs without this bar touching the ground; but in an emergency the motorman may in an instant depress the front bar to the position seen in dotted lines in Fig. 2 by lifting the upper end of the rocking fender. The means herein shown for thus lifting the upper end of the fender comprise a simple rocking foot-lever $j$. (Seen in detail in Fig. 5.) This lever is a curved rocker coupled at its front end to the rear bar $c$ of the fender and projecting back through an aperture in or under the lower edge of the dashboard D, its free end being in a convenient position for the motorman to depress it and rock the lever with his foot, thus elevating the outer or forward end of the lever and through it the upper rear end of the fender.

The car will be fitted at both ends with bearing-brackets $i$ and springs $h$, and in placing the fender the lugs $g\, g$ are first passed through the eyes of the springs $h\, h$, and the pivoting-lugs $d\, d$ then dropped into their bearings. To remove the fender, it is lifted until the lugs $d$ are free, when the lugs $g$ are drawn from the eyes on the springs.

I do not limit myself to the exact construction shown, as this may be varied somewhat without departing from my invention; but the construction is very simple, inexpensive, and effective.

Having thus described my invention, I claim—

1. The combination with a car provided with fulcrum-bearings for the fender, and with upright springs having eyes, of the fender, having laterally-projecting pivoting-lugs which rest in said bearings, and rearwardly-projecting lugs g, g, at its upper end which engage said eyes in the springs, and a foot-lever on the platform which takes under the upper end of the fender, whereby the motorman may lift the upper end of the fender and thus rock the latter, substantially as set forth.

2. The combination with a car provided with fulcrum-bearings, projecting out beyond the dashboard, for the fender, and upright springs h, h, one at each side, back of said bearings, of the removable fender, having laterally-projecting pivoting-lugs which rest in said bearings, and rearwardly-projecting, rigid lugs g, g, at its upper end which engage eyes in the upper ends of the respective springs h, and a foot-lever on the platform which projects out under the upper end of the fender, substantially as and for the purpose set forth.

3. The combination with a car provided with open fulcrum-bearings and with upright, coil-springs h, having eyes h', at their upper ends, of a fender having laterally-projecting pivoting-lugs d, d, which engage said fulcrum-bearings, rearwardly-projecting lugs g, g, which engage the eyes in the springs, and a rocking foot-lever, j, coupled to the upper end of the fender and projecting rearwardly onto the platform within convenient reach of the foot of the motorman, substantially as set forth.

In witness whereof I have hereunto signed my name, this 29th day of March, 1899, in the presence of two subscribing witnesses.

THOMAS McGOVERN.

Witnesses:
HENRY CONNETT,
PETER A. ROSS.